United States Patent [19]

Akashi et al.

[11] 3,860,449

[45] Jan. 14, 1975

[54] LOW FRICTION MAGNETIC RECORDING MEDIUM

[75] Inventors: Goro Akashi; Masaaki Fujiyama; Akira Kasuga, all of Odawara, Japan

[73] Assignee: Fuji Photo Film Co., Ltd., Kanagawa, Japan

[22] Filed: May 8, 1972

[21] Appl. No.: 250,992

Related U.S. Application Data

[63] Continuation-in-part of Ser. No. 874,378, Nov. 5, 1969, abandoned.

[30] Foreign Application Priority Data

Nov. 6, 1968 Japan ............................... 43-81069

[52] U.S. Cl. ................................... 117/235, 117/68

[51] Int. Cl. ............................................ H01f 10/00

[58] Field of Search ............................ 117/235–240, 117/68

[56] References Cited

UNITED STATES PATENTS

| | | | |
|---|---|---|---|
| 3,293,066 | 12/1966 | Haines | 117/240 |
| 3,423,233 | 1/1969 | Akashi et al. | 117/235 |
| 3,470,021 | 9/1969 | Hendricx et al. | 117/235 X |
| 3,476,596 | 11/1969 | Carroll | 117/239 X |
| 3,542,589 | 11/1970 | Hartmann et al. | 117/235 |
| 3,617,378 | 11/1971 | Beck | 117/235 X |
| 3,622,386 | 11/1971 | Larsen | 117/235 |
| 3,630,910 | 12/1971 | Akashi et al | 117/235 |
| 3,687,725 | 8/1972 | Hartmann et al. | 117/235 |

OTHER PUBLICATIONS

Friedman et al., Vol. 9, No. 7, Dec. 66, IBM Tech. Dis. Bull.

*Primary Examiner*—William D. Martin
*Assistant Examiner*—Bernard D. Pianato
*Attorney, Agent, or Firm*—Sughrue, Rothwell, Mion, Zinn and Macpeak

[57] ABSTRACT

A magnetic recording medium such as an endless magnetic tape having increased wear-resistance and friction characteristics comprising a support, a magnetic recording layer one side of said support and a lubricating layer on the opposite side of said support comprising tungsten disulfide particles and finely divided particles having a Mohs' hardness of higher than 5 dispersed in a resin binder.

5 Claims, No Drawings

LOW FRICTION MAGNETIC RECORDING MEDIUM

CROSS-REFERENCE TO RELATED APPLICATIONS

The present application is a continuation-in-part application of earlier application Ser. No. 874,378 filed Nov. 5, 1969 and now abandoned.

BACKGROUND OF THE INVENTION

1. Field of the Invention

This invention relates to a magnetic recording medium, in particular, to an improved low friction magnetic recording medium suitable for use as an endless loop magnetic recording tape having the characteristics of excellent wear-resistance and low friction.

2. Description of the Prior Art

Endless loop magnetic tapes have heretofore been generally composed of a film support, a magnetic recording layer provided on one side of the support and a lubricating layer provided on the opposite side thereof. The magnetic recording layer has been provided by the application of a coating composition comprising finely divided iron oxide particles dispersed in a binder. The lubricating layer has been provided by the application of a composition comprising graphite particles having a diameter of less than 10 microns, dispersed in a binder.

It has been found that the wear-resistance of the magnetic recording tape depends on the properties of the lubricating layer and, therefore, many methods have been proposed to improve the wear-resistance of the lubricating layer. However, the majority of these methods have been mainly concerned with the provision of uneven or striped patterns on the lubricating layer. Such endless tapes, having uneven or striped patterns, such as dots or oblique patterns possess a considerably longer life. However, as the fields of application of endless tapes have been expanding very widely, a new field in which such conventional endless tape is unsatisfactory in durability or life, has now been developed, namely that of video recording which requires the use of high tape speeds. As the travelling velocity of an endless tape increases, the wear-resistance of an endless tape in which graphite particles are incorporated as a lubricant in the lubricating layer becomes insufficient which results in the drop-out of signals recorded on the tape due to the crumbling of the graphite-containing layer. Therefore, it is desired to improve the wear-resistance of such graphite-containing layers.

SUMMARY OF THE INVENTION

An object of the present invention is to provide a magnetic recording medium which operates efficiently with a minimum amount of surface friction and without resulting deterioration of recording fidelity.

A further object of the present invention is to provide an improved low friction magnetic recording tape especially suitable for use as an endless magnetic tape in single reel recording devices.

Another object of the instant invention is the provision of an improved magnetic recording tape, the prolonged use of which will not damage the transducer elements of a tape recorder.

Another object of this invention is to provide an improved, extremely reliable magnetic recording medium especially suitable for applications where frequent maintenance is impracticable.

Other objects and advantages of the invention will hereinafter become more fully apparent from the following description.

According to the present invention, there is provided a magnetic recording medium comprising a support, a magnetic recording layer and at least one lubricating layer, said lubricating layer containing tungsten disulfide particles having an average size of less than 10 microns.

DETAILED DESCRIPTION OF THE INVENTION

As in the case with the prior art graphite-containing lubricating layers, the lubricating layer of the present invention is prepared by mixing tungsten disulfide particles, a resinous binder and a solvent therefor, and applying the thus mixed coating composition onto a support followed by drying. The average size of the tungsten disulfide particles to be used generally is less than 10 microns, preferably less than 3 microns. The lubricating layer may be provided on the side of the tape opposite to the side having the magnetic recording layer and/or on the magnetic recording layer. Further, the lubricating layer may contain finely divided particles having an average size of less than 10 microns, of a material having a Mohs' hardness of more than 5, in addition to the tungsten disulfide particles. Examples of such materials are wolframite, chromite, cobaltite, smaltite, sodalite, magnetite, rutile, diaspore, quartz, garnet, agate, zircon, spinel, corundum, Carborundum, etc. These particles, including the tungsten disulfide, are incorporated in the lubricating layer in an amount within the range of 60–95% by weight, based on the weight of the lubricating layer. The thickness of the lubricating layer employed in the present invention is preferably within the range of 0.1–3 microns.

The invention will further be illustrated by the following examples, in which all parts are by weight.

COMPARATIVE EXAMPLE

A coating composition was prepared by mixing in a ball mill the following components:

| | |
|---|---|
| Gamma—$Fe_2O_3$ | 300 parts |
| Vinyl Chloride-vinyl acetate copolymer(as a binder) | 60 parts |
| Liquid nitrile rubber (as a plasticizer) | 10 parts |
| Tricresyl phosphate (as a plasticizer) | 10 parts |
| Butyl acetate(as a dispersing and dissolving agent) | 500 parts |
| Isopropyl alcohol (as a dispersing and dissolving agent) | 50 parts |

The composition was applied to one side of a polyester film having a thickness of 25 microns and dried to form a magnetic recording layer of a dry thickness of 12 microns. A coating composition to be used as a lubricating layer was prepared by mixing in a ball mill the following components:

| | |
|---|---|
| Graphite particles having an average size of 10 microns (as a lubricant) | 300 parts |
| Vinyl chloride-vinyl acetate copolymer (as a dispersing and dissolving agent) | 60 parts |
| Tricresyl phosphate (as a plasticizer) | 15 parts |
| Amyl acetate (as a dispersing and dissolving agent) | suitable amount to make a dispersion |

Then the coating composition thus prepared was applied to the side of the film opposite the magnetic recording layer in a gravure pattern of 150 mesh to form a lubricating layer having a dry thickness of 2 microns.

The coated web was slit to a 6.25 mm. width to form a tape and 190 m. of the thus prepared tape was made into an endless loop and loaded into a cartridge. The tape-loaded cartridge was mounted in a tape recorder and travelled at a speed of 152.4 cm/sec. to test the wear-resistance of the tape. In the test, the amount of the crumbling of the lubricating layer, "wow" and "flutter" were measured to evaluate the wear-resistance and the life of the tape. That is, the life of the tape was determined by the length of time it took for the amount of "wow" and "flutter" to reach 5%, since "wow" and "flutter" of a magnetic recording tape increases in relation to the crumbling of the lubricating layer thereof.

From the results of this test, it was found that crumbling of the tape occurred to a remarkable extent after only 5 minutes of travel and 5% of "wow" and "flutter" were indicated by a meter after only 32 minutes of travel.

EXAMPLE 1

A magnetic recording tape was prepared in the same manner as described in aforesaid Comparative Example except that, in place of the graphite particles, 400 parts of tungsten disulfide particles having an average size of 8 microns were used in the preparation of the lubricating layer.

The tape was tested as in the Comparative Example and it was found that after 5 minutes of travel, only an extremely small amount of crumbling was observed in the tape and thereafter no further crumbling was observed. The "wow" and "flutter" were found to be 5% only after 49 hours and 20 minutes of travel.

From the results of the test, it can be clearly seen that the use of the tungsten disulfide resulted in a significantly more prolonged life (high wear-resistance) of the tape than the graphite of the tape prepared in the aforesaid Comparative Example at high tape speeds.

EXAMPLE 2

Three kinds of magnetic recording tape were produced by applying a coating composition which was prepared by adding 50 parts (Tape 2A), 100 parts (Tape 2B), and 200 parts (Tape 2C), respectively, of chromium oxide particles having an average particle size of 5 microns to the lubricating layer coating composition as described in Example 1.

Those tapes were tested as above and it was shown that "wow" and "flutter" were 5% after 85 hours of travel for Tape 2A, after 130 hours of travel for Tape 2B, and after 195 hours of travel for Tape 2C, respectively.

EXAMPLE 3

Four kinds of magnetic recording tapes were produced as described in Example 2 except that, in place of the chromium dioxide, 100 parts of each of the following materials were substituted, respectively, garnet (Tape 3A), tungsten carbonate (Tape 3B), cerium oxide (Tape 3C) and alumina (Tape 3D).

These tapes were tested and it was shown that "wow" and "flutter" were 5% after 59 hours of travel for Tape 3A, after 63 hours of travel for Tape 3B, after 110 hours of travel for Tape 3C and after 121 hours of travel for Tape 3D, respectively.

It will, therefore, be seen from the results of Examples 2 and 3 that it was possible to further prolong the life of the endless magnetic tape by incorporating other fine particles of a material having high hardness together with the tungsten disulfide. The reason for this is believed to be that the crystals of tungsten disulfide are flakey and hence have a tendency toward being flaked by mechanical force. However, such tendency is restrained by intermixing the tungsten disulfide with fine powders of a material which is not readily flaked by mechanical force, such as chromium oxide and aluminum oxide, whereby the durability of the tungsten disulfide and hence the lubricating layer, is further improved. Accordingly, the material to be mixed with tungsten sulfide for this purpose is required to have a comparatively high hardness as set forth hereinabove.

EXAMPLE 4

A magnetic coating composition having the same formulation as in the above Comparative Example was prepared and coated onto a polyethylene terephthalate film having a thickness of 25 microns to thereby form a magnetic recording layer having a dry thickness of 12 microns. Thereafter, four different coating compositions to be used as a lubricating layer were prepared by mixing in a ball mill the ingredients shown in the following table and each of the resulting coating lubricating compositions were coated onto different areas of the opposite side of the polyethylene terephthalate film from the magnetic recording layer by means of a gravure coating process to thereby form a lubricating layer having a dry thickness of 2 microns. The coated film was slit to a 6.35 millimeter width to form four different magnetic recording tapes having different lubricating layers. The composition of the four different lubricating layers are shown in the following table, each resulting in Samples 1 through 4, respectively:

TABLE I

| Sample No. | 1 | 2 | 3 | 4 |
|---|---|---|---|---|
| Lubricant Powder | polytetra-fluoroethylene | graphite | molybde-num bisulfide | tungsten disulfide |
| Specific Gravity | 2.15 | 2.26 | 4.8 | 7.5 |
| Particle Size (microns) | 10 | 10 | 6 | 8 |

Table I – Continued

| Sample No. | 1 | 2 | 3 | 4 |
|---|---|---|---|---|
| Amount (g) of Lubricant Powder | 285 | 300 | 630 | 1000 |
| Amoung (g) of Binder (vinyl chloride-vinyl acetate copolymer) | 60 | 60 | 60 | 60 |
| Amount (g) of Tricresyl phosphate (plasticizer) | 15 | 15 | 15 | 15 |
| Amount (g) of Butyl acetate (solvent) | 800 | 800 | 800 | 800 |

Sample 1 employs a polytetrafluoroethylene lubricant material disclosed in U.S. Pat. No. 3,276,946 to Cole et al.; Sample No. 2 utilizes graphite which is taught in U.S. Pat. No. 2,804,401 to Cousino as a lubricant for magnetic tape; Sample No. 3 utilizes molybdenum bisulfide which is disclosed in U.S. Pat. No. 3,041,196 to Stella as a lubricant in magnetic tape; and Sample No. 4 contains a lubricating layer containing tungsten disulfide according to the present invention.

As an additional comparison, a fifth sample tape was prepared wherein the following coating composition was coated onto one side of a polyethylene terephthalate having a thickness of 25 microns and dried to form a magnetic recording layer of a dry thickness of 12 microns. The coated film was slit to a width of 6.35 millimeters (¼ of an inch) to form a magnetic recording tape. The composition used to coat this film was as follows:

| | |
|---|---|
| $\gamma$—$Fe_2O_3$ | 300 g |
| vinyl chloride-vinyl acetate copolymer (binder) | 60 g |
| nitrile rubber (do.) | 10 g |
| tricresyl phosphate (plasticizer) | 10 g |
| tungsten disulfide (lubricant) | 15 g |
| butyl acetate | 800 cc |

In order to determine the wear-resistance of Samples 1–5 as prepared above, magnetic recording tapes were prepared each having a length of 190 meters and each tape was loaded into a cartridge. The tape-loaded cartridge was then mounted into a tape recorder wherein it was travelled at a speed of 152.4 centimeters per second to test its durability. The degree of crumbling of the lubricating layer was noted as well as the amount of time it took to achieve 5% of the "wow" and "flutter" since these values increase in relation to the crumbling of the lubricating layer and also indicate the durability of the same. In other words, the longer the time it takes for the material to achieve 5% of the "wow" and "flutter" values, the more excellent the durability thereof. The results were as follows:

For Sample No. 1, from the very start of the test, the "wow" and "flutter" meter indicated over 5% and it was observed that, due to crumbling, the travelling was not smooth.

In Sample No. 2, after 5 minutes of travel, remarkable crumbling of the lubricating layer was observed and after 32 minutes of travel, 5% of the "wow" and "flutter" values were attained.

After 5 minutes of travel of Sample No. 3, a slight crumbling of the lubricating layer was observed and after 55 minutes of travel, the 5% "wow" and "flutter" value was reached, thus indicating that the durability was little better than that of Sample No. 2.

With regard to Sample No. 5, immediately after travelling had begun in the recorder, 5% of the "wow" and "flutter" value were obtained and it was impossible to continue the operation.

However, with regard to Sample No. 4, using the tungsten disulfide lubricant of the present invention, it was only after 55 hours of travel that 5% of the "wow" and "flutter" value was reached, thus indicating a vastly superior durability as compared to Samples 1–4.

What is claimed is:

1. A magnetic recording medium having increased wear-resistance and friction characteristics comprising a support, a magnetic recording layer provided on one side of said support and a lubricating layer provided on the opposite side of said support from said magnetic recording layer, said lubricating layer consisting essentially of from 60 to 95% by weight, based on the weight of the lubricating layer, of tungsten disulfide particles having an average particle size of less than 10 microns and finely divided particles of a material having a Mohs' hardness of higher than 5 dispersed in a synthetic resin binder.

2. A magnetic recording medium having increased wear-resistance and friction characteristics comprising a support, a magnetic recording layer provided on one side of said support and a lubricating layer provided on the opposite side of said support from said magnetic recording layer, said lubricating layer consisting essentially of from 60 to 95% by weight, based on the weight of the lubricating layer, of tungsten disulfide particles having an average particle size of less than 10 microns, and finely divided particles having an average size of less than 10 microns of a material having a Mohs' hardness of higher than 5 dispersed in a synthetic resin binder.

3. The magnetic recording medium of claim 2, wherein said finely divided particles comprise at least one member selected from the group consisting of wolframite, chromite, cobaltite, smaltite, sodalite, magnetite, rutile, diaspore, quartz, garnet, zircon, spinel, corundum, Carborundum, tungsten carbonate, cerium oxide or alumina.

4. The magnetic recording medium of claim 1, wherein the thickness of said lubricating layer is from 0.1 to 3 microns.

5. An endless magnetic recording tape for use at high recording speeds having increased wear-resistance and friction characteristics comprising a support, a magnetic recording layer provided on one side of said support and a lubricating layer provided on the opposite side of said support from said magnetic recording layer, said lubricating layer consisting essentially of, dispersed in a synthetic resin binder, from 60 to 95% by weight, based on the weight of the lubricating layer, of tungsten disulfide particles having an average particle size of less than 10 microns and finely divided particles having an average particle size of less than 10 microns of a material having a Mohs' hardness of greater than 5.

* * * * *